US011544937B2

(12) United States Patent
Minami et al.

(10) Patent No.: US 11,544,937 B2
(45) Date of Patent: Jan. 3, 2023

(54) CONTROL DEVICE, CONTROL METHOD, AND COMPUTER READABLE MEDIUM

(71) Applicant: Mitsubishi Logisnext Co., Ltd., Kyoto (JP)

(72) Inventors: Shogo Minami, Kyoto (JP); Koji Shiizaki, Kyoto (JP); Akira Ando, Kyoto (JP); Hajime Kodaira, Kyoto (JP); Kiichi Sugimoto, Tokyo (JP); Kenta Nakao, Tokyo (JP); Satoshi Iio, Tokyo (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 177 days.

(21) Appl. No.: 16/843,935

(22) Filed: Apr. 9, 2020

(65) Prior Publication Data
US 2020/0327341 A1 Oct. 15, 2020

(30) Foreign Application Priority Data

Apr. 11, 2019 (JP) .............................. JP2019-075677
Mar. 4, 2020 (JP) .............................. JP2020-037260

(51) Int. Cl.
*G06V 20/58* (2022.01)
*B62D 15/02* (2006.01)

(52) U.S. Cl.
CPC ........... *G06V 20/58* (2022.01); *B62D 15/021* (2013.01)

(58) Field of Classification Search
CPC ............. G06K 9/00805; B62D 15/021; G06V 20/58; B66F 17/003; E02F 9/24; E02F 9/261; H04N 7/181; G08G 1/166
See application file for complete search history.

(56) References Cited

U.S. PATENT DOCUMENTS

| 10,882,538 | B1* | 1/2021 | Witt ....................... G01S 15/931 |
| 10,902,263 | B1* | 1/2021 | Angel ..................... A61H 3/061 |
| 2006/0274147 | A1 | 12/2006 | Chinomi et al. |
| 2013/0147958 | A1* | 6/2013 | Mitsuta .................. B60K 35/00 348/148 |
| 2015/0183370 | A1* | 7/2015 | Nakanishi ............... E02F 9/261 348/148 |
| 2018/0027179 | A1 | 1/2018 | Matsuzaki et al. |

(Continued)

FOREIGN PATENT DOCUMENTS

| JP | H-7-206396 A | 8/1995 |
| JP | A-2005-134971 | 5/2005 |

(Continued)

OTHER PUBLICATIONS

Extended European Search Report for European Application No. 20168787.8, dated Jun. 16, 2020.

(Continued)

*Primary Examiner* — Md K Talukder
(74) *Attorney, Agent, or Firm* — Blank Rome LLP

(57) ABSTRACT

A control device includes a specifying unit that specifies one of a plurality of detection objects on the basis of a state of an industrial vehicle when the plurality of detection objects are detected around the industrial vehicle, and a control unit that causes a notification to be performed for the one detection object specified by the specifying unit in an aspect different from those of other detected detection objects.

8 Claims, 10 Drawing Sheets

(56) References Cited

U.S. PATENT DOCUMENTS

| | | | |
|---|---|---|---|
| 2018/0057049 A1 | 3/2018 | Stewart et al. | |
| 2018/0301029 A1* | 10/2018 | Nilsson | G06V 20/58 |
| 2019/0111843 A1* | 4/2019 | Yamada | B60K 35/00 |
| 2019/0266859 A1* | 8/2019 | Song | G05D 1/0248 |
| 2019/0273977 A1* | 9/2019 | Miyasaka | H04S 1/00 |
| 2020/0082185 A1* | 3/2020 | Yamamoto | G06V 20/58 |
| 2020/0189614 A1* | 6/2020 | Ito | G06V 20/597 |
| 2020/0277757 A1* | 9/2020 | Kurokami | E02F 9/24 |
| 2020/0327341 A1* | 10/2020 | Minami | E02F 9/261 |

FOREIGN PATENT DOCUMENTS

| | | | | |
|---|---|---|---|---|
| JP | A-2006-011516 | | 1/2006 | |
| JP | 2010-198519 A | | 9/2010 | |
| JP | 2010198519 A | * | 9/2010 | E02F 9/24 |
| JP | A-2015-009646 | | 1/2015 | |
| JP | 2016-222428 A | | 12/2016 | |
| JP | 2017-101420 A | | 6/2017 | |
| JP | A-2018-014554 | | 1/2018 | |
| JP | A-2018-157449 | | 10/2018 | |

OTHER PUBLICATIONS

Chinese Office Action for Chinese Application No. 202010251651.3, dated Apr. 27, 2021.
EP20168787.8, Jun. 16, 2020, Extended European Search Report.
Office Action dated Feb. 16, 2021, Japanese Application No. 2020-037260, with English translation.
JP2019-075677, Feb. 25, 2020, Office Action.
Office Action for Japanese Application No. 2019-075677, dated Feb. 25, 2020.
[No Author Listed] Vision Plus Brochure: Sensor-less, Tag-less Technology. Vision Plus. https://taylorforklifts.com/brochures/interactive/visionplus-brochure_ver2108/, dated Sep. 24, 2018, 4 pages.
Japanese Office Action for Japanese Application No. 2020-037260, dated Oct. 19, 2021.

* cited by examiner

CONTROL DEVICE, CONTROL METHOD, AND COMPUTER READABLE MEDIUM

BACKGROUND OF THE INVENTION

Field of the Invention

The present invention relates to a control device, a control method, and a non-transitory tangible computer readable medium.

CROSS-REFERENCE TO RELATED APPLICATION

Priority is claimed on Japanese Patent Application No. 2019-075677, filed Apr. 11, 2019 and 2020-037260, filed Mar. 4, 2020, the contents of which are incorporated herein by references.

Description of Related Art

Industrial vehicles such as forklifts or wheel loaders have different features from general passenger vehicles, such as turning angles of wheels included in a vehicle body or a structure of the vehicle. Therefore, especially for a driver who has little experience in driving the industrial vehicle, a region in which the vehicle actually moves is likely to be different from an expected region when the driver is performing work such as driving or cargo handling of the industrial vehicle, or the driver is likely to be unable to recognize a region that is a blind spot.

Patent Document 1 describes, as a related art, a technology for calling a driver's attention when a forklift moves backwards.

PATENT DOCUMENTS

[Patent Document 1] Japanese Unexamined Patent Application, First Publication No. 2016-222428

SUMMARY OF INVENTION

Incidentally, when a driver is notified of a direction of an obstacle present around an industrial vehicle, the driver cannot understand the direction of the obstacle simply by listening to a sound of the notification.

An object of the present invention is to provide a control device, a control method, and a non-transitory tangible computer readable medium storing a program capable of solving the above problem.

According to a first aspect, a control device includes a specifying unit configured to specify one of a plurality of detection objects on the basis of a state of an industrial vehicle when the plurality of detection objects are detected around the industrial vehicle on the basis of a captured image of an image-capturing device including a plurality of cameras; and a control unit configured to cause a notification to be performed for the one detection object specified by the specifying unit in an aspect different from those of other detected detection objects on the basis of information on the camera that has captured an image of the one detection object specified by the specifying unit and the captured image used for specifying of the detection object.

According to a second aspect, in the control device according to the first aspect, the state includes at least one of a distance between the industrial vehicle and the detection object, a steering angle of a wheel of the industrial vehicle, and a traveling direction of the industrial vehicle.

According to a third aspect, in the control device according to the first or second aspect, the control unit displays the one detection object specified by the specifying unit on a display unit in an aspect different from those of the other detected detection objects.

According to a fourth aspect, in the control device according to any one of the first to third aspects, the control unit displays the captured image used for specifying of the one detection object on a display unit on the basis of the information on the camera that has captured an image of the one detection object specified by the specifying unit.

According to a fifth aspect, in the control device according to the fourth aspect, the control unit specifies a position of the detection object to be displayed on the display unit on the basis of a position of the detection object in the captured image and the information on the camera.

According to a sixth aspect, the control device according to any one of the first to fifth aspects further includes a surroundings display unit configured to create a bird's-eye view image of surroundings of the industrial vehicle from the captured image of the image-capturing device, wherein the control unit performs a display on the display unit for the one detection object specified by the specifying unit along an outer edge of the surroundings display unit in an aspect different from those of other detected detection objects.

According to a seventh aspect, in the control device according to any one of the first to fifth aspects, the control unit outputs a sound different from the other detection object from a speaker corresponding to a position of the one detection object specified by the specifying unit.

According to an eighth aspect, a control method includes the steps of: specifying one of a plurality of detection objects on the basis of a state of an industrial vehicle when the plurality of detection objects are detected around the industrial vehicle on the basis of a captured image of an image-capturing device including a plurality of cameras; and causing a notification to be performed for the one specified detection object in an aspect different from those of other detected detection objects on the basis of information on the camera that has captured an image of the one specified detection object and the captured image used for specifying of the detection object.

According to a ninth aspect, a non-transitory tangible computer readable medium storing a program causes a computer to: specify one of a plurality of detection objects on the basis of a state of an industrial vehicle when the plurality of detection objects are detected around the industrial vehicle on the basis of a captured image of an image-capturing device including a plurality of cameras; and cause a notification to be performed for the one specified detection object in an aspect different from those of other detected detection objects on the basis of information on the camera that has captured an image of the one specified detection object and the captured image used for specifying of the detection object.

According to the at least one aspect, the driver can intuitively understand directions of obstacles present around an industrial vehicle.

DETAILED DESCRIPTION OF INVENTION

First Embodiment

Hereinafter, an industrial vehicle 1 according to a first embodiment of the present invention will be described.

Figure 1:
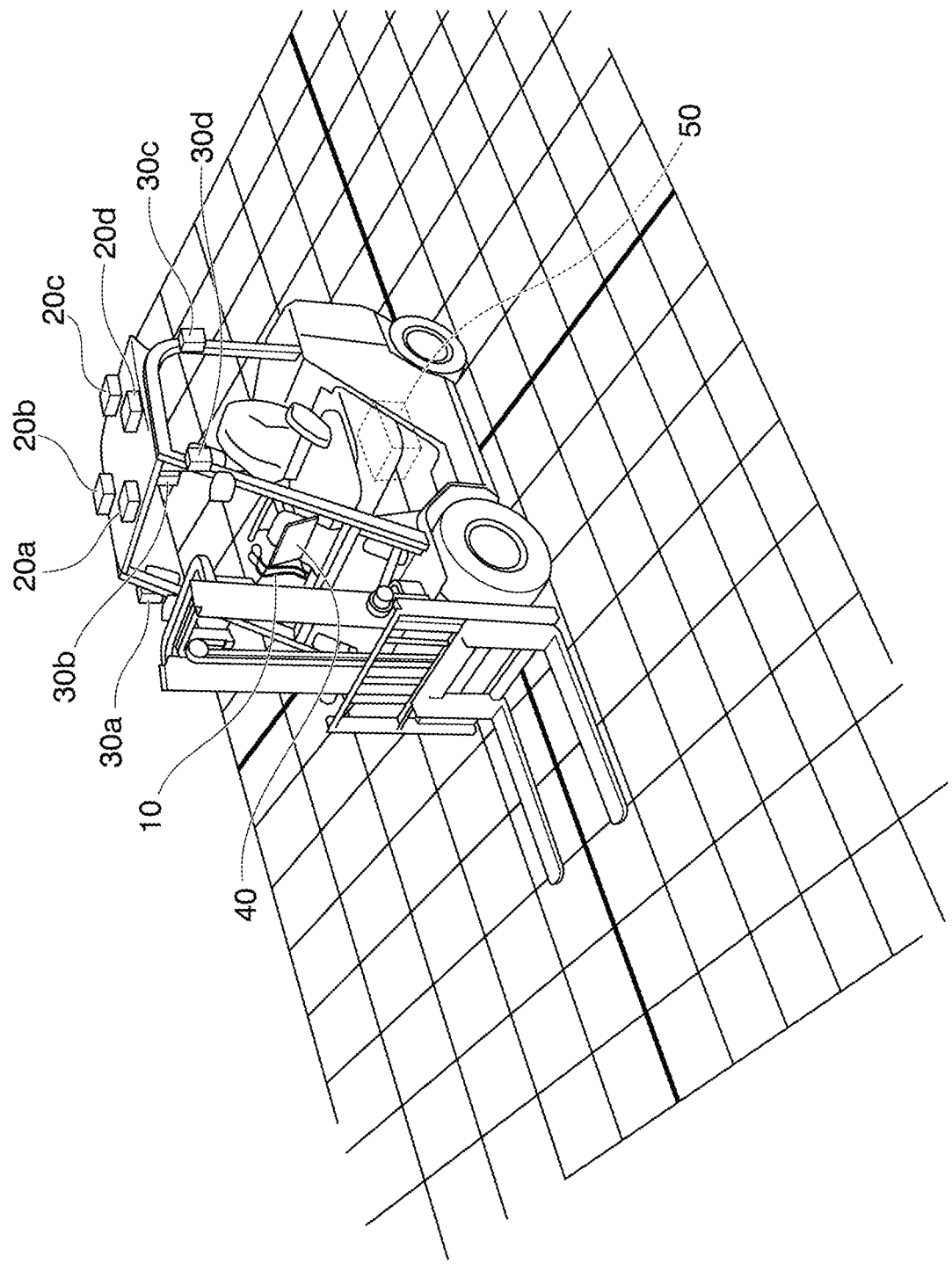
FIG. 1 is a diagram showing a configuration of an industrial vehicle according to at least an embodiment of the present invention.

The industrial vehicle 1 is, for example, a forklift as shown in FIG. 1. However, the industrial vehicle 1 may be a construction machine such as a wheel loader, a vehicle having a similar mechanism such as a cargo handling apparatus or rear wheel steering, or a vehicle having similar problems.

The industrial vehicle 1 includes an operation device 10, a first camera 20a, a second camera 20b, a third camera 20c, a fourth camera 20d, a first speaker 30a, a second speaker 30b, a third speaker 30c, a fourth speaker 30d, a display unit 40, and a control device 50, as shown in FIG. 1.

The first camera 20a, the second camera 20b, the third camera 20c, and the fourth camera 20d are collectively referred to as an image-capturing device 20. Further, the first speaker 30a, the second speaker 30b, the third speaker 30c, and the fourth speaker 30d are collectively referred to as a notification device 30.

The operation device 10 is a device that receives an operation when a driver performs moving or cargo handling work on the industrial vehicle 1. For example, the operation device 10 is, for example, a shift lever that determines a forward and backward movement of the industrial vehicle 1, a steering wheel that determines a steering angle of the industrial vehicle 1, and an accelerator and a brake for adjusting a speed or acceleration of the industrial vehicle 1.

The image-capturing device 20 is provided so that a plurality of cameras each capture images of a region in an outer peripheral direction of the industrial vehicle 1 and capture images of all surroundings of the industrial vehicle 1.

Figure 2:
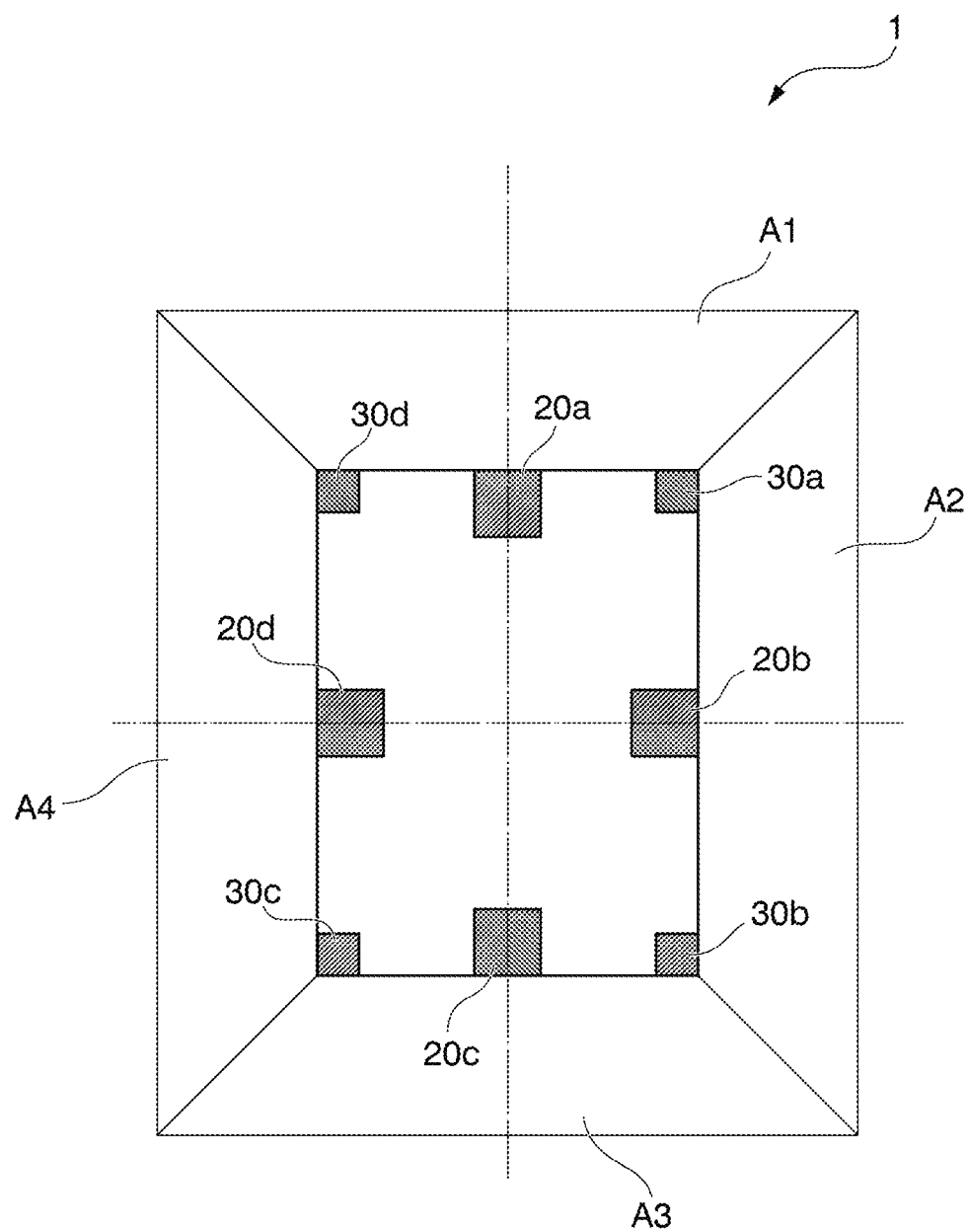
FIG. 2 is a schematic diagram in a case in which the industrial vehicle according to at least an embodiment of the present invention is overlooked from directly above.

For example, the first camera 20a, the second camera 20b, the third camera 20c, and the fourth camera 20d are respectively provided on an upper front, upper right, upper rear, and upper left of the industrial vehicle 1, as shown in FIG. 1. For example, the first camera 20a captures images of a first image-capturing region A1 shown in FIG. 2. Similarly, the second camera 20b, the third camera 20c, and the fourth camera 20d respectively capture images of a second image-capturing region A2, a third image-capturing region A3, and a fourth image-capturing region A4 shown in FIG. 2.

Although cameras are respectively provided on the upper front, upper right, upper rear, and upper left of the industrial vehicle 1 in the first embodiment of the present disclosure, cameras may be provided in different directions in other embodiments. Further, in another embodiment, it is possible to reduce the number of cameras while capturing images of all surroundings of the industrial vehicle 1 using a plurality of cameras including a fisheye lens or the like. Further, the image-capturing device 20 according to another embodiment may capture images of all surroundings of the industrial vehicle 1 using the camera repeating rotation. Further, when there are blind spots in the four cameras, five or more cameras can be provided. Persons are included as detection targets to be detected by these cameras. Here, the blind spot is a region in which a detection target with which the industrial vehicle 1 is likely to come into contact is not captured.

(Notification Device 30)

The notification device 30 outputs a sound under the control of the control device 50.

For example, the first speaker 30a, the second speaker 30b, the third speaker 30c, and the fourth speaker 30d are respectively provided at the right front, the rear right, the rear left, and the left front of the driver's seat, as shown in FIG. 1. When a detection target is detected in an image captured by the image-capturing device 20 by the control device 50, a speaker provided in a direction corresponding to a position of the detection target outputs a sound.

Thus, the driver can understand in which direction the detection target is present.

Further, when a plurality of detection targets have been detected by the control device 50, a speaker provided in a direction corresponding to the position of one detection target determined on the basis of a state of the industrial vehicle 1 among the plurality of speakers outputs a different sound (a sound with a different tone, a different volume, or the like) from the sounds output from other speakers. The state of the industrial vehicle 1 is a state including at least one of a distance between the industrial vehicle 1 and the detection target, a steering angle of the industrial vehicle 1, and a traveling direction of the industrial vehicle 1. Further, the one detection target determined on the basis of the state of the industrial vehicle 1 is a detection target to which the most attention is to be paid, which has been determined according to at least one of a movement range of the industrial vehicle 1 estimated from the distance between the industrial vehicle 1 and the detection target and the steering angle of the industrial vehicle 1 and a movement range of the industrial vehicle 1 estimated from the traveling direction. Thus, the driver can understand in which direction the detection target to which the most attention is to be paid among the plurality of detection targets is present.

(Display Unit 40)

Figure 3:
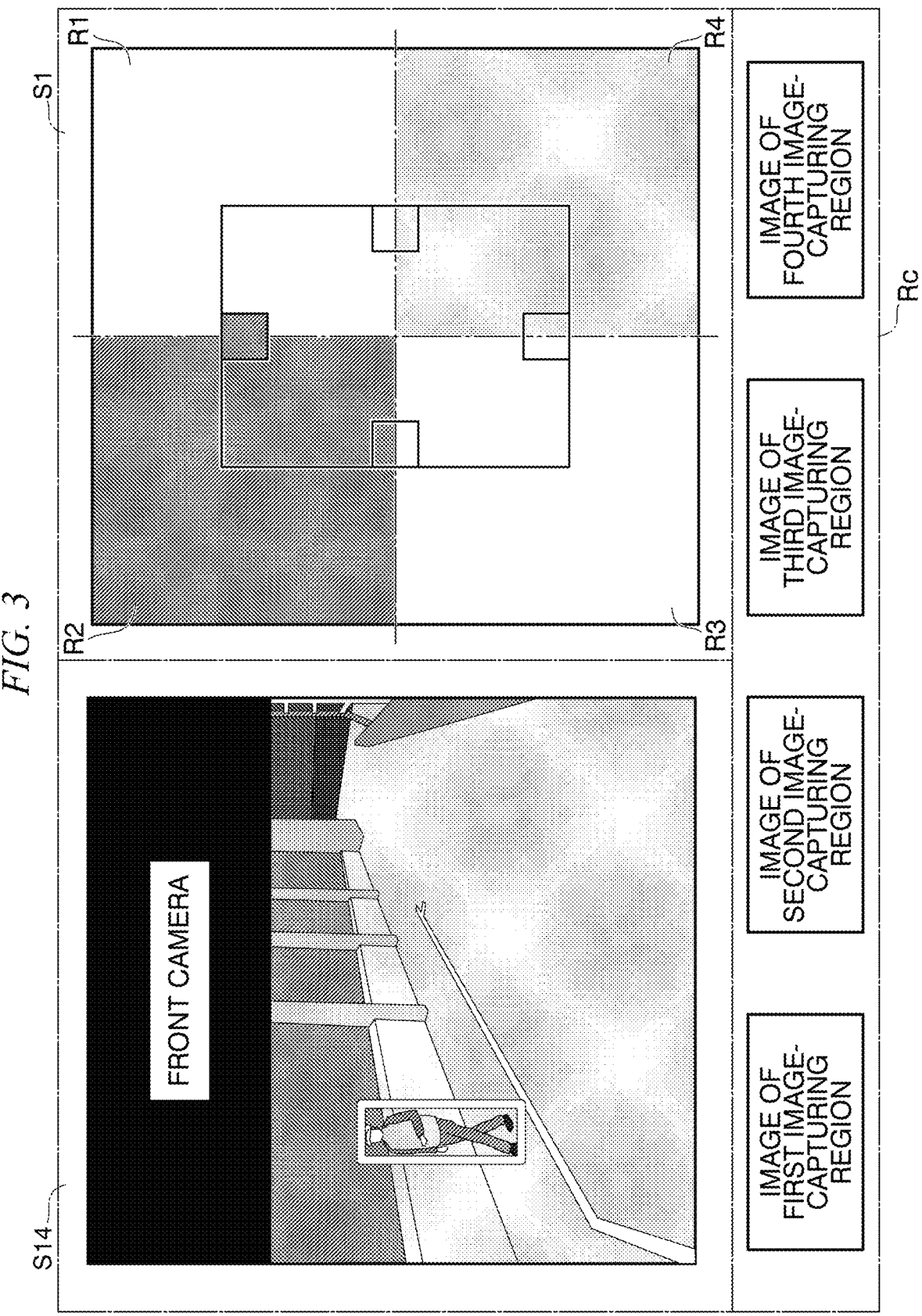
FIG. 3 is a diagram showing a display example of a display unit according to at least an embodiment of the present invention.

The display unit 40 displays information on an image captured by the image-capturing device 20 under the control of the control device 50. FIG. 3 is a diagram showing a display example of the display unit 40 in the first embodiment. In the embodiment, a display area of the display unit 40 is divided into a region display area Ra, a large image display area Rb, and a small image display area Rc.

For example, an image of the first image-capturing region A1 captured by the first camera 20a, an image of the second image-capturing region A2 captured by the second camera 20b, an image of the third image-capturing region A3 captured by the third camera 20c, and an image of the fourth image-capturing region A4 captured by the fourth camera 20d are displayed in small size in the small image display area Re of the display unit 40, as shown in FIG. 3.

Further, an image indicating the region in which the detection target has been detected is displayed in the region display area Ra of the display unit 40. The region display area Ra is divided into a first region R1 that is a right front region, a second region R2 that is a left front region, a third region R3 that is a left rear region, and a fourth region R4 that is a right rear region. An image indicating an outer shape of the industrial vehicle 1 is displayed at a center of the region display area Ra, and a camera icon is displayed at a position in the image in which a camera is provided. Specifically, when the detection target is detected in the second region R2 among the first region R1, the second region R2, the third region R3, and the fourth region R4, the display unit 40 displays the second region R2 in the region display area Ra in an aspect different from those of the first region R1, the third region R3, and the fourth region R4 in which no detection target is detected. For example, when a detection target has been detected in left front of the industrial vehicle 1, the second region R2 among the display areas of the display unit 40 lights (the brightness of the second region R2 is made higher than those of other regions). Further, the display unit 40 displays an icon corresponding to the camera that has captured an image of the detection target among camera icons displayed in the region display area Ra in an aspect different from those of icons corresponding to other cameras.

Further, when the detection target is detected in a plurality of regions, the display unit 40 displays a region to which the most attention is to be paid among the plurality of regions in the region display area Ra in an aspect different from those of other regions in which the detection target has been detected. Specifically, when the detection target is detected in the second region R2 and the fourth region R4 among the first region R1, the second region R2, the third region R3, and the fourth region R4 and when the second region R2 is a region to which the most attention is to be paid, the display unit 40 displays the second region R2 in an aspect different from that of the fourth region R4 in the region display area Ra, as shown in FIG. 3. For example, the display unit 40 causes the second region R2 to blink and the fourth region R4 to light up. Further, the display unit 40 enlarges and displays an image including the detection target captured by the camera 20a that has captured an image of the detection target to which the most attention is to be paid in the large image display area Rb, as shown in FIG. 3.

Thus, the driver can understand in which direction the detection target is present. Further, when detection targets are present in a plurality of regions, the driver can intuitively understand the detection target to which the most attention is to be paid.

The detection target to which the most attention is to be paid is specified by the control device 50. A method in which the control device 50 specifies the detection target to which the most attention is to be paid will be described below.

Further, for example, when the display unit 40 enlarges and displays the image of the detected detection target, the display unit 40 may display information of the camera that has captured the image in the large image display area Rb, as shown in FIG. 3. For example, the display unit 40 may display, within the enlarged displayed image, information indicating a camera that has captured the image, such as a "front camera" indicating that the first camera 20a has captured an image, a "right camera" indicating that the second camera 20b has captured an image, a "rear camera" indicating that the third camera 20c has captured an image, and a "left camera" indicating that the fourth camera 20d has captured an image. Thus, the driver can more clearly understand in which direction the detection target to which the most attention is to be paid among the plurality of detection targets is present.

(Control Device 50)

Figure 4:
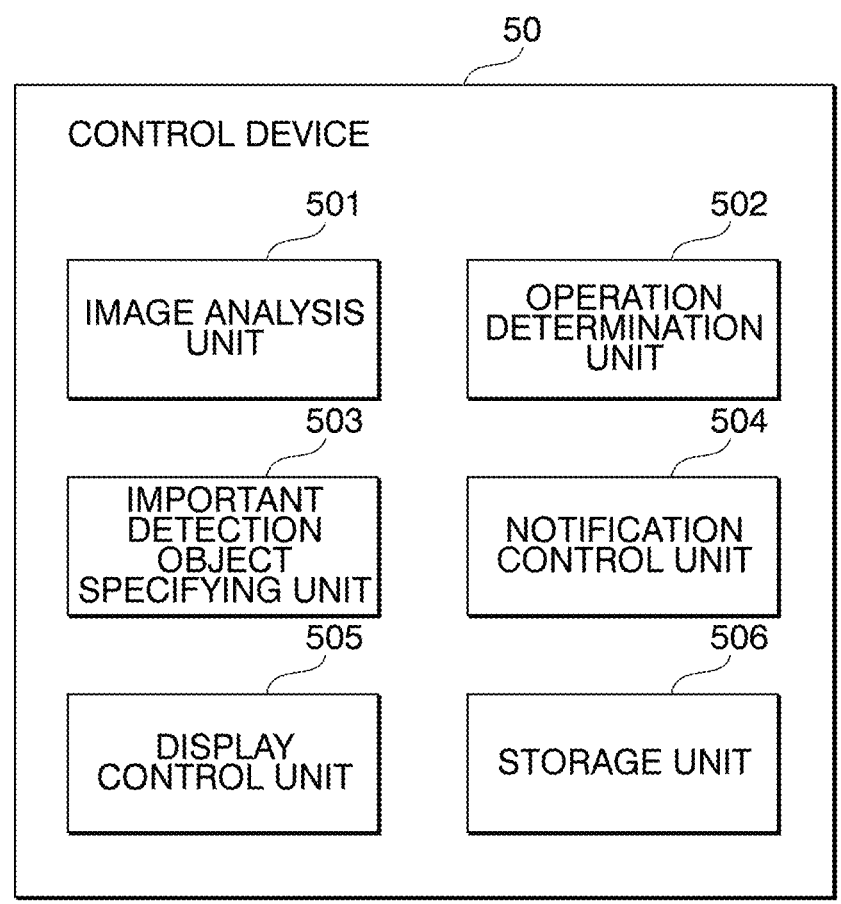
FIG. 4 is a diagram showing a configuration of a control device according to at least an embodiment of the present invention.

The control device 50 is a device that controls the notification device 30 and the display unit 40 on the basis of the state of the industrial vehicle 1. The control device 50 includes an image analysis unit 501, an operation determination unit 502, an important detection object specifying unit 503 (an example of a specifying unit), a notification control unit 504 (an example of a control unit), a display control unit 505 (an example of a control unit), and a storage unit 506, as shown in FIG. 4.

The image analysis unit 501 determines whether the detection target has been detected in the image captured by the image-capturing device 20.

For example, the image analysis unit 501 stores features of the detection target including a person in advance. The image analysis unit 501 repeatedly acquires the captured images in an order of the first camera 20a, the second camera 20b, the third camera 20c, and the fourth camera 20d. Each time an image is acquired, the image analysis unit 501 determines that the detection target has been detected in the acquired image when the image analysis unit 501 has determined that the detection target including the person stored in advance is included in the acquired image using a pattern recognition technology.

When the detection target has been detected in the acquired image, the image analysis unit 501 specifics on which of right and left sides of the image the detection target has been detected.

For example, when the detection of the detection target in the image is performed using a pattern recognition technology, the image analysis unit 501 specifies on which of the left side and right side of the image the detection target has been detected according to whether a portion of which a degree of matching the feature of the detection target stored in advance is highest is included in the left side or the right side of the image.

Further, when the detection target has been detected in the acquired image, the image analysis unit 501 specifies from which of the first camera 20a, the second camera 20b, the third camera 20c, and the fourth camera 20d the detected image has been acquired.

Further, when the detection target has been detected in the acquired image, the image analysis unit 501 estimates the distance between the detected detection target and the industrial vehicle 1.

For example, the image analysis unit 501 stores an image size (the number of pixels) corresponding to a size of the detection target and estimates the distance between the industrial vehicle 1 and the detection target from a ratio between the stored image size and the size of the detection target (the number of pixels) detected within the image.

Further, for example, image-capturing performance, an installation position in the industrial vehicle 1, and an image-capturing direction of each of the first camera 20a, the second camera 20b, the third camera 20c, and the fourth camera 20d are understood in advance. Therefore, the image analysis unit 501 can understand an image-capturing range indicated by a distance in a depth direction and a distance in a horizontal direction in advance and can estimate in a range of a distance from the industrial vehicle 1 the captured image is present. That is, the image analysis unit 501 can estimate, in the image captured by the image-capturing device 20, a distance indicated by one pixel upward from the bottom among up, down, right, and left of the image (that is, the distance in the depth direction), and a distance indicated by one pixel right or left from the center from the center of the bottom of the image, for example. Therefore, the image analysis unit 501 can specify where the detection target has been detected within the image (for example, whether the detection target has been detected at a position shifted by certain pixels upward and shifted by certain pixels left and right with respect to a center of a bottom of the image) to estimate the distance between the industrial vehicle 1 and the detection target.

Further, for example, when the image-capturing device 20 is a stereo camera, the image analysis unit 501 may use a triangulation technology for a pair of captured images at respective image-capturing timings captured by the stereo camera to estimate the distance between the industrial vehicle 1 and the detection target. In addition, the distance between the industrial vehicle 1 and the detection target may be measured by being provided with a distance sensor.

Each time the detection target is detected in the acquired image, the image analysis unit 501 outputs a detection result image, detection position information indicating which of right and left sides of the image the detection target has been detected, first detection camera information indicating the camera that has captured an image in which the detection target is included, and distance information indicating the distance between the industrial vehicle 1 and the detection target, to the important detection object specifying unit 503.

The operation determination unit 502 specifies content of an operation performed with respect to the industrial vehicle 1 by the driver from a sensor (not shown) provided in the industrial vehicle 1 and a state of the operation device 10. For example, the operation determination unit 502 acquires a current vehicle speed of the industrial vehicle 1 from a sensor (not shown) provided in the industrial vehicle 1. Further, the operation determination unit 502 acquires a signal output due to a change in the operation device 10 or periodically acquires a signal indicating the state of the operation device 10. Here, a vehicle state of the industrial vehicle 1, which the operation determination unit 502 acquires from a sensor (not shown) provided in the industrial vehicle 1 and from the operation device 10 includes a steering angle of the industrial vehicle 1 when the driver has rotated a steering wheel, a traveling direction of the industrial vehicle 1 when the driver has switched a shift lever between forward and backward movements, and a state in which the driver has depressed an accelerator or a brake, in addition to a vehicle speed.

The important detection object specifying unit 503 acquires the operation information from the operation determination unit 502. When the important detection object specifying unit 503 has received the detection result image, the detection position information, the first detection camera information, and the distance information from the image analysis unit 501, the important detection object specifying unit 503 specifies a state of the industrial vehicle 1 on the basis of the operation information and the distance information.

When the important detection object specifying unit 503 specifies the state of the industrial vehicle 1, the important detection object specifying unit 503 stores industrial vehicle state information in which a specifying time and the state of the industrial vehicle 1 have been associated with each other, the detection result image, the detection position information, and the first detection camera information in the storage unit 506, for example.

The important detection object specifying unit 503 determines whether or not the industrial vehicle state information is stored in the storage unit 506 within a time (hereinafter referred to as "within a determination time") going back to a time necessary for the image-capturing device 20 to capture images of all surroundings of the industrial vehicle 1 from the present time. That is, the industrial vehicle 1 according to the first embodiment includes four cameras. Therefore, when the cameras are selected one by one in a predetermined image acquisition cycle and an image-capturing process is performed, the determination time is four times the image acquisition cycle.

For example, when there is no industrial vehicle state information within the determination time in the storage unit 506, the important detection object specifying unit 503 determines that the detection target has not been detected within the determination time. On the other hand, when there is industrial vehicle state information within the determination time in the storage unit 506, the important detection object specifying unit 503 determines that the detection target has been detected. That is, this means that the detection target has been detected once while all surroundings of the industrial vehicle 1 have been captured images. Further, when the other industrial vehicle state information is present within the determination time in the storage unit 506, the important detection object specifying unit 503 determines that a plurality of detection targets have been detected.

When the important detection object specifying unit 503 has determined that a plurality of detection targets have been detected within the determination time, the important detection object specifying unit 503 specifies the detection target to which the most attention is to be paid among the detection targets in all the surroundings on the basis of the state of the industrial vehicle 1 indicated by the industrial vehicle state information.

For example, the important detection object specifying unit 503 specifies a detection object, which is present at a position closest to the industrial vehicle 1 among detection objects present in the traveling direction of the industrial vehicle 1, as the detection target to which the most attention is to be paid. When the important detection object specifying unit 503 specifies the detection target to which the most attention is to be paid, the important detection object specifying unit 503 outputs the second detection camera information indicating a camera that has captured an image of the detection target and the detection position information thereof to the notification control unit 504 and the display control unit 505.

When the important detection object specifying unit 503 has determined that the detection target has been detected only once within the determination time, the important detection object specifying unit 503 outputs the detected camera information as second detection camera information together with the detection position information to the notification control unit 504 and the display control unit 505.

When the notification control unit 504 has determined that the second detection camera information and the detection position information have been received from the important detection object specifying unit 503, the notification control unit 504 outputs the sound from the speaker provided in a direction in which the detection target is present on the basis of the second detection camera information and the detection position information.

Specifically, when the second detection camera information indicates the first camera 20a and the detection position information indicates that the detection target has been detected on the right side of the image, or when the second detection camera information indicates the second camera 20b and the detection position information indicates that the detection target has been detected on the left side of the image, the notification control unit 504 controls the notification device 30 so that a sound is output from the first speaker 30a. When the second detection camera information indicates the second camera 20b and the detection position information indicates that the detection target has been detected on the right side of the image, or when the second detection camera information indicates the third camera 20c and the detection position information indicates that the detection target has been detected on the left side of the image, the notification control unit 504 controls the notification device 30 so that a sound is output from the second speaker 30b.

Similarly, the notification control unit 504 controls the notification device 30 so that a sound is output from the third speaker 30c and the fourth speaker 30d on the basis of the second detection camera information and the detection position information.

When the notification control unit 504 determines that the second detection camera information and the detection position information have been received from the important detection object specifying unit 503 and when a plurality of detection targets have been detected with the determination time on the basis of the industrial vehicle state information recorded in the storage unit 506, the notification control unit 504 outputs the sound from a plurality of speakers provided in the direction in which the detection target is present.

However, the notification control unit 504 controls the notification device 30 so that the sound to be output from the speaker corresponding to the detection target to which the most attention is to be paid is output in an aspect different from those of the sounds output from the other speakers on the basis of the second detection camera information and the detection position information.

Specifically, when the second detection camera information indicates the first camera 20a and the detection position information indicates that the detection target has been detected on the right side of the image, or when the second detection camera information indicates the second camera 20b and the detection position information indicates that the detection target has been detected on the left side of the image, the notification control unit 504 controls the notification device 30 so that the sound output from the first speaker 30a is output in an aspect different from the sounds output from the other speakers.

Further, similarly, the notification control unit 504 controls the notification device 30 so that the sound is output from the second speaker 30b, the third speaker 30c, or the fourth speaker 30d in an aspect different from those of the sounds output from the other speakers on the basis of the second detection camera information and the detection position information.

The display control unit 505 acquires the image captured images by the image-capturing device 20 and displays the acquired image in the small image display area Rc of the display unit 40.

For example, the display control unit 505 acquires an image which is the same as the image acquired by the image analysis unit 501 from the image-capturing device 20 in synchronization with a timing at which the image analysis unit 501 repeatedly acquires captured images in an order of the first camera 20a, the second camera 20b, the third camera 20c, and the fourth camera 20d.

The display control unit 505 displays the image of the first image-capturing region A1 captured by the first camera 20a, the image of the second image-capturing region A2 captured by the second camera 20b, the image of the third image-capturing region A3 captured by the third camera 20c, and the image of the fourth image-capturing region A4 captured by the fourth camera 20d, which have been acquired, in a small size in the small image display area Rc, as shown in FIG. 3.

When the second detection camera information and the detection position information have been acquired from the important detection object specifying unit 503, the display control unit 505 displays the region in which the detection target has been detected in the region display area Ra of the display unit 40 in an aspect different from that of the region in which the detection target has not been detected on the basis of the second detection camera information and the detection position information.

For example, when the detection target has been detected in the second region R2 among the first region R1, the second region R2, the third region R3, and the fourth region R4, the display control unit 505 displays the second region R2 in the region display area Ra of the display unit 40 in an aspect different from those of the first region R1, the third region R3, and the fourth region R4 in which the detection target has not been detected. For example, the display control unit 505 causes the second region R2 to light up.

Further, the display control unit 505 enlarges the image including the detection target captured by the camera and displays the enlarged image in the large image display area Rb of the display unit 40.

When the display control unit 505 determines that the second detection camera information and the detection position information have been received from the important detection object specifying unit 503 and when a plurality of detection targets have been detected within the determination time on the basis of the industrial vehicle state information recorded in the storage unit 506, the display control unit 505 displays the region to which the most attention is to be paid among the plurality of regions in the region display area Ra of the display unit 40 in an aspect different from those of the other regions in which the detection target has been detected.

Specifically, when the detection target is detected in the second region R2 and the fourth region R4 among the first region R1, the second region R2, the third region R3, and the fourth region R4, and the second region R2 is a region to which the most attention is to be paid, the display control unit 505 causes the second region R2 to blink and causes the fourth region R4 in the region display area Ra to light up. Further, the display control unit 505 enlarges the image including the detection target captured by the camera 20a that has captured an image of the detection target to which the most attention is to be paid and displays the enlarged image in the large image display area Rb of the display unit 40.

A position of the first speaker 30a corresponds to the first region R1. A position of the second speaker 30b corresponds to the second region R2. A position of the third speaker 30c corresponds to the third region R3. A position of the fourth speaker 30d corresponds to the fourth region R4. Therefore, the display control unit 505 can specify the first region R1, the second region R2, the third region R3, and the fourth region R4 corresponding to the position of the detection target by using the same method as the method in which the notification control unit 504 specifies the speaker corresponding to the position of the detection target.

Further, for example, as shown in FIG. 3, when the display control unit 505 enlarges the image of the detected detection target and displays the image in the large image display area Rb of the display unit 40 as shown in FIG. 3, the display control unit 505 may display, in the large image display area Rb on the display unit 40, information indicating a camera that has captured the image, such as the "front camera" indicating that the first camera 20*a* has captured an image, the "right camera" indicating that the second camera 20*b* has captured an image, the "rear camera" indicating that the third camera 20*c* has captured an image, and the "left camera" indicating that the fourth camera 20*d* has captured an image.

The storage unit 506 stores various types of information necessary for a process that is performed by the control device 50.

For example, the storage unit 506 stores industrial vehicle state information in which a time and the state of the industrial vehicle 1 are associated with each other, an image of a detection result, the detection position information, and the first detection camera information.

(Operation of Industrial Vehicle 1)

Next, a process that is performed by the industrial vehicle 1 will be described. Here, a processing flow of the control device 50 shown in FIG. 5 will be described.

Figure 5:
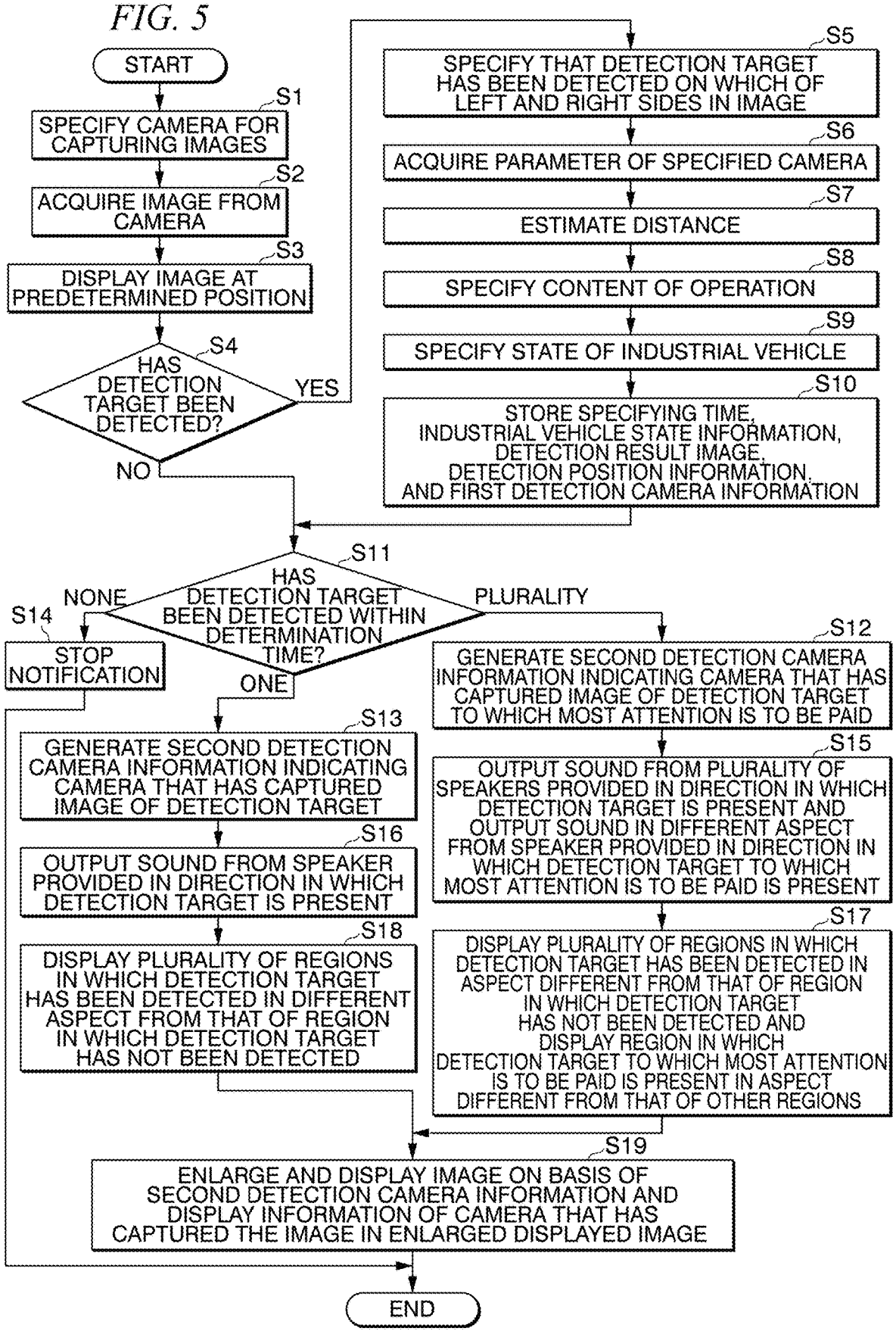
FIG. 5 is a diagram showing a processing flow of an industrial vehicle according to at least an embodiment of the present invention.

The control device 50 executes a process shown in FIG. 5 in a predetermined image acquisition cycle. It is assumed that the image-capturing device 20 captures images of all surroundings of the industrial vehicle 1. The image analysis unit 501 of the control device 50 specifies one camera for capturing images in an order of the first camera 20*a*, the second camera 20*b*, the third camera 20*c*, and the fourth camera 20*d* (step S1). The image analysis unit 501 acquires an image from the specified camera (step S2). Further, the display control unit 505 displays the acquired image at a predetermined position in the small image display area Rc of the display unit 40 according to the camera that has captured the acquired image (step S3).

The image analysis unit 501 compares a feature of the detection target stored in advance with the image captured by the image-capturing device 20 and determines whether the detection target has been detected in the image (step S4).

When the image analysis unit 501 does not detect the detection target in the acquired image (NO in step S1), the image analysis unit 501 jumps to step S11.

Further, when the image analysis unit 501 detects the detection target in the acquired image (YES in step S1), the image analysis unit 501 specifies on which of the left and right sides in the image the detection target has been detected (step S5).

For example, when the detection target is detected in the image using a pattern recognition technology, the image analysis unit 501 determines on which of the left side and right side of the image the detection target has been detected according to whether a portion matching the feature of the detection target stored in advance is included in the left side or the right side of the image.

Then, the image analysis unit 501 acquires information on the camera specified in step S1 (imaging performance, an installation position in the industrial vehicle 1, and an imaging direction) (step S6).

Further, when the detection target has been detected in the acquired image, the image analysis unit 501 estimates the distance between the detected detection target and the industrial vehicle 1 on the basis of the image acquired in step S2 (step S7).

For example, the image analysis unit 501 can store an image size (the number of pixels) corresponding to the size of the detection target and estimate the distance between the industrial vehicle 1 and the detection target from a ratio between the stored image size and the size of the detection target (the number of pixels) detected within the image.

Each time the detection target is detected in the acquired image, the image analysis unit 501 outputs the detection result image, the detection position information indicating which of right and left sides of the image the detection target has been detected, the first detection camera information indicating the camera that has captured the image in which the detection target is included, and the distance information indicating the distance between the industrial vehicle 1 and the detection target, to the important detection object specifying unit 503.

The important detection object specifying unit 503 acquires the operation information from the operation determination unit 502 (step S8). The operation determination unit 502 specifies the content of the operation performed with respect to the industrial vehicle 1 by the driver from a sensor (not shown) provided in the industrial vehicle 1 and the state of the operation device 10.

The important detection object specifying unit 503 specifies the state of the industrial vehicle 1 on the basis of the operation information and the distance information (step S9) and stores the specifying time, the industrial vehicle state information, the detection result image, the detection position information, and the first detection camera information in the storage unit 506 (step S10). Then, the important detection object specifying unit 503 determines whether or not the detection target has been detected within a determination time on the basis of information in the storage unit 506 (step S11). The determination time is four times the image acquisition cycle. That is, the important detection object specifying unit 503 determines whether or not the detection target has been detected in the image acquired in step S2 and the images captured by the three other cameras acquired before that.

When the plurality of detection targets have been detected within the determination time (plurality in step S11), the important detection object specifying unit 503 generates second detection camera information indicating the camera that has captured an image of the detection target to which the most attention is to be paid (step S12). When the detection target has been detected only once within the determination time (one in step S11), the important detection object specifying unit 503 sets the camera that has captured an image of the detected detection target as the second detection camera information (step S13). When no detection target has been detected within the determination time (No in step S11), notification, such as the notification by the notification control unit 504 and the display by the display control unit 505, is stopped (step S14).

The important detection object specifying unit 503 outputs the second detection camera information and the detection position information to the notification control unit 504 and the display control unit 505.

When the plurality of detection targets have been detected within the determination time (plurality in step S11), the notification control unit 504 outputs sounds from a plurality of speakers provided in the direction in which the detection target is present. In this case, the notification control unit 504 sets an aspect of the sound output from the speaker corresponding to the detection target to which the most attention is to be paid to an aspect different from that of the sound output from the other speakers (step S15). When the detection target has been detected only once within the determination time (one in step S11), the notification control unit 504 outputs a sound from a speaker provided in the direction in which the detection target is present (step S16).

When the plurality of detection targets have been detected within the determination time (the plurality in step S11), the display control unit 505 displays the plurality of regions in which the detection targets are detected in an aspect different from those of the regions in which the detection targets are not detected. In this case, the display control unit 505 displays a region corresponding to the detection target to which the most attention is to be paid in an aspect different from other regions in which the detection target has been detected (step S17). When the display control unit 505 has detected the detection target only once within the determination time (one in step S11), the display control unit 505 displays the region in which the detection target has been detected in an aspect different from that of the region in which the detection target has not been detected (step S18).

The display control unit 505 enlarges the image captured by the camera indicated by the second detection camera information generated in step S12 or step S13 and displays the enlarged image in the large image display area Rb of the display unit 40. In this case, the display control unit 505 displays the information of a camera that has captured the image in the enlarged displayed image (step S19).

(Operations and Effects)

The industrial vehicle 1 according to an embodiment of the present invention has been described above.

In the control device 50 of the industrial vehicle 1 according to the embodiment of the present invention, when a plurality of detection targets have been detected around the industrial vehicle 1, the important detection object specifying unit 503 specifies one of the plurality of detection targets on the basis of a state of the industrial vehicle 1. The notification control unit 504 and the display control unit 505 cause the one specified detection target to be notified in an aspect different from those of the other detected detection targets.

Thus, the driver can intuitively understand a position at which a specific detection target is present as compared with a case in which the driver understands that the detection target has been detected by listening to the sound and then understands a position at which a detection target is present by looking at a display on a monitor.

Specifically, when a plurality of detection targets have been detected, the notification control unit 504 notifies of the detection target to which the most attention is to be paid in an aspect different from those of other detection targets using a notification device 30 so that the driver can intuitively understand the direction in which the detection target is present just by listening to the sound. Further, when the plurality of detection targets have been detected, the display control unit 505 notifies of the detection target to which the most attention is to be paid in an aspect different from those of the other detection targets using the display unit 40 so that the driver can intuitively understand the direction in which the detection target is present just by looking at the display.

Further, in this case, the driver can also intuitively understand the detection target to which the most attention is to be paid.

Second Embodiment

The industrial vehicle 1 according to the first embodiment performs the display of the captured image and the notification of the region in which the detection target has been detected using one component. On the other hand, an industrial vehicle according to the second embodiment separately includes a surroundings monitoring device that is a component that performs a display of a captured image, and a detection object notification device that is a component that performs a notification of a region in which the detection target has been detected. This is because the detected detection target cannot be displayed within the bird's-eye view image in some cases when an image region for creating a bird's-eye view image is narrower than an image region for performing detection in addition to a case in which some users may desire to mount only the surroundings monitoring device. Further, this is because, even when the detection target can be displayed within the bird's-eye view image, the detection target cannot be appropriately detected or an appropriate display cannot be performed, for example, due to great change in a shape of the detection target when the bird's-eye view image is created.

Figure 6:
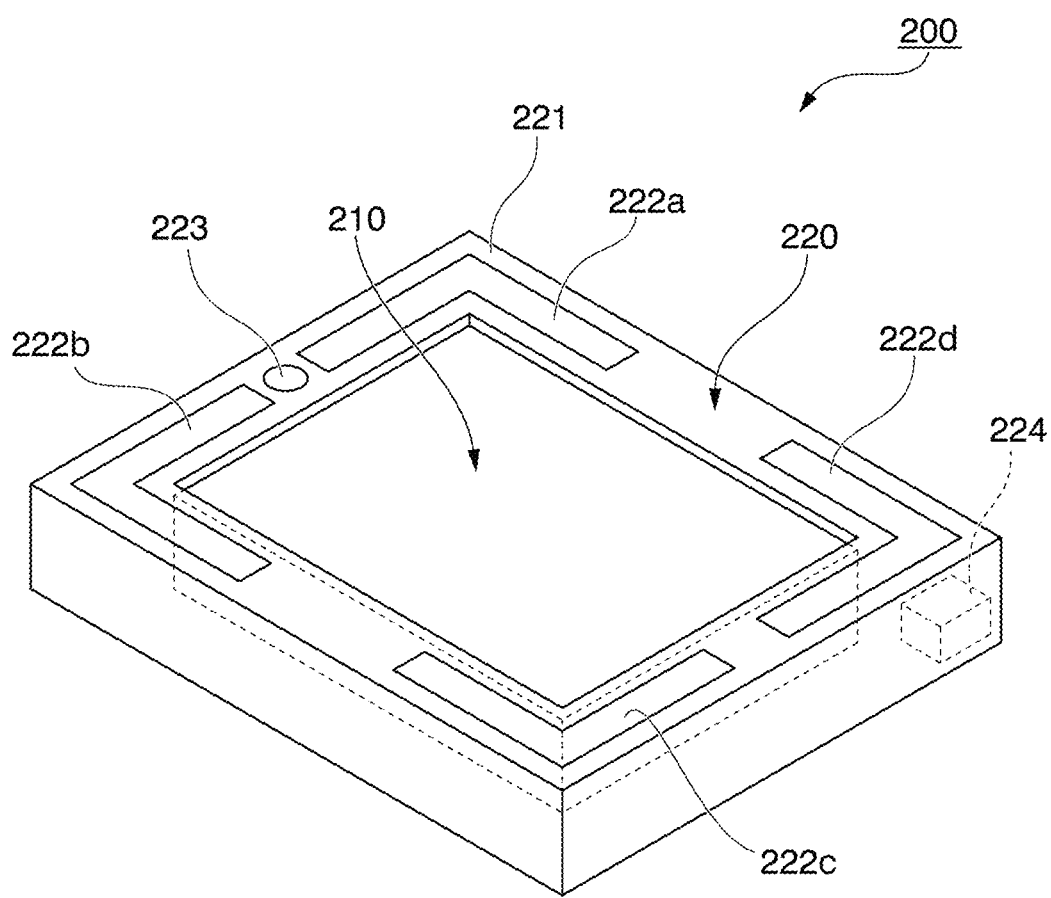
FIG. 6 is an external view of a detection object notification system according to at least an embodiment of the present invention.

FIG. 6 is an external view of a detection object notification system 200 according to the second embodiment. The industrial vehicle 1 according to the second embodiment includes the detection object notification system 200 shown in FIG. 6 in place of the first speaker 30*a*, the second speaker 30*b*, the third speaker 30*c*, the fourth speaker 30*d*, the display unit 40, and the control device 50 according to the first embodiment.

The detection object notification system 200 includes a surroundings monitoring device 210 and a detection object notification device 220.

The surroundings monitoring device 210 converts the images captured by the first camera 20*a*, the second camera 20*b*, the third camera 20*c*, and the fourth camera 20*d* into the bird's-eye view image and displays the bird's-eye view image. An image showing the industrial vehicle 1 is displayed at a center of the bird's-eye view image. The detection object notification device 220 is configured as a housing that covers the surroundings monitoring device 210 from above. The detection object notification device 220 notifies a user of the presence of the detection target near the industrial vehicle 1.

The surroundings monitoring device 210 and the detection object notification device 220 operate separately. That is, the surroundings monitoring device 210 does not control the detection object notification device 220, and the detection object notification device 220 does not control the surroundings monitoring device 210.

(Surroundings Monitoring Device 210)

Figure 7:
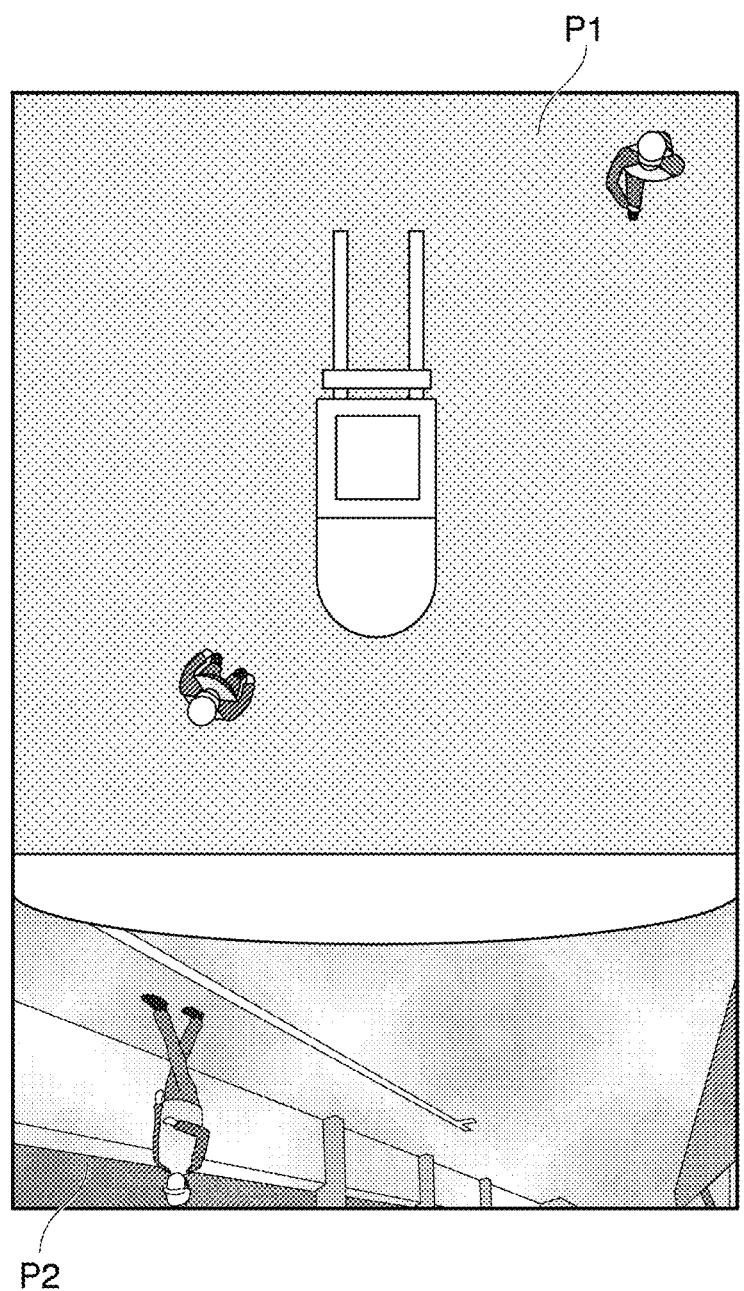
FIG. 7 shows an example of an image that is displayed on a surroundings monitoring device according to at least an embodiment of the present invention.

FIG. 7 is an example of an image that is displayed on the surroundings monitoring device 210 according to the second embodiment. The surroundings monitoring device 210 displays a bird's-eye view image P1 generated by processing the images captured by the first camera 20*a*, the second camera 20*b*, the third camera 20*c*, and the fourth camera 20*d*, and an original image P2 captured by any one of the first camera 20*a*, the second camera 20*b*, the third camera 20*c*, and the fourth camera 20*d*. The original image P2 may be displayed rotated or inverted according to the camera that has been captured. For example, the surroundings monitoring device 210 displays the original image P2 captured by the third camera 20*a* that captures an image of a rear region in an upside down state so that the user can easily understand that the rear region is captured in the original image P2.

In the embodiment, in the image captured by each camera, a portion used for detection and a portion used for a display may be different. For example, the detection object notification device 220 performs detection using an entire region of the image, whereas the surroundings monitoring device 210 may trim a portion of the image to generate the bird's-eye view image P1.

(Detection Object Notification Device 220)

The detection object notification device 220 includes a housing unit 221, a first region lamp 222a, a second region lamp 222b, a third region lamp 222c, a fourth region lamp 222d, a state notification lamp 223, a buzzer 224, and a control device 225. The first region lamp 222a, the second region lamp 222b, the third region lamp 222c, the fourth region lamp 222d, and the state notification lamp 223 are examples of a display unit.

The housing unit 221 is a rectangular parallelepiped housing and is provided to cover the surroundings monitoring device 210 from above. A rectangular opening is provided in a portion corresponding to a display of the surroundings monitoring device 210 on a front surface of the housing unit 221.

The first region lamp 222a is an L-shaped lamp. The first region lamp 222a is provided to surround an upper right portion of an opening of the housing unit 221.

The second region lamp 222b is an L-shaped lamp. The second region lamp 222b is provided to surround an upper left portion of the opening of the housing unit 221.

The third region lamp 222c is an L-shaped lamp. The third region lamp 222c is provided to surround a lower left portion of the opening of the housing unit 221.

The fourth region lamp 222d is an L-shaped lamp. The fourth region lamp 222d is provided to surround a lower right portion of the opening of the housing unit 221.

The state notification lamp 223 is provided between the first region lamp 222a and the second region lamp 222b. The state notification lamp 223 indicates a state of the detection object notification device 220. For example, when the detection object notification device 220 is operating normally, the state notification lamp 223 lights up in green. Further, when a detection function of the detection target of the detection object notification device 220 is not operating normally, the state notification lamp 223 lights up in red. Further, when the detection object notification device 220 is not operating, the state notification lamp 223 is turned off.

The buzzer 224 emits a warning sound when the detection target has been detected by the control device 225.

The first region lamp 222a, the second region lamp 222b, the third region lamp 222c, the fourth region lamp 222d, and the state notification lamp 223 are configured of, for example, LEDs.

The control device 225 is provided inside the housing unit 221. The control device 225 controls the first region lamp 222a, the second region lamp 222b, the third region lamp 222c, the fourth region lamp 222d, the state notification lamp 223, and the buzzer 224.

The control device 225 according to the second embodiment has the same configuration as that of the control device 50 according to the first embodiment. That is, the control device 225 includes the image analysis unit 501, the operation determination unit 502, the important detection object specifying unit 503, the notification control unit 504, the display control unit 505, and the storage unit 506. On the other hand, the control device 225 according to the second embodiment operates differently from the control device 50 according to the first embodiment.

(Operation of Detection Object Notification Device 220)

Figure 8:
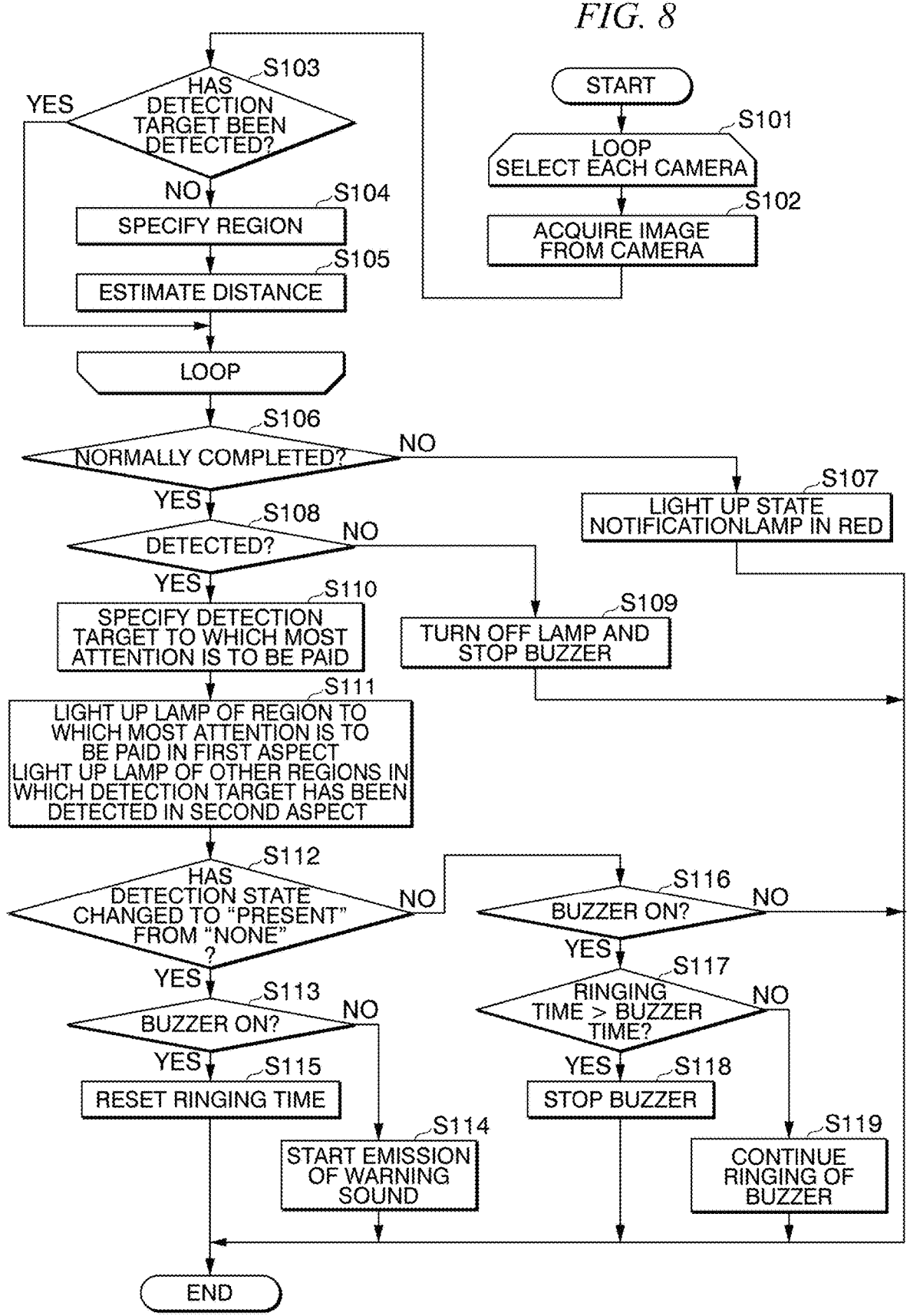
FIG. 8 is a diagram showing a processing flow of the industrial vehicle according to at least an embodiment of the present invention.

When the control device 225 is activated, the display control unit 505 causes the state notification lamp 223 to light up in green. The control device 225 executes a process shown in FIG. 8 for each determination time.

First, the image analysis unit 501 of the control device 225 selects the first camera 20a, the second camera 20b, the third camera 20c, and the fourth camera 20d one by one in each image acquisition cycle (step S101) and performs processes of steps S102 to S105 below on the selected camera.

The image analysis unit 501 acquires the image captured by the camera selected in step S101 (step S102). The image analysis unit 501 analyzes the acquired image and determines whether or not the detection target is captured in the image (step S103). That is, the image analysis unit 501 determines whether the detection target has been detected from the acquired image. When the detection target has been detected from the image (step S103 YES), the image analysis unit 501 specifies the region in which the detection target has been detected on the basis of a position at which the detection target is captured in the image (step S104). The image analysis unit 501 estimates the distance between the industrial vehicle 1 and the detection target on the basis of the acquired image and the information on the camera selected in step S101 (step S105).

When the image analysis unit 501 performs a detection target detection process on the image captured by each camera, the image analysis unit 501 determines whether or not the image analysis has been normally completed for all the captured images (step S106). When the image analysis has abnormally ended for at least one captured image (NO in step S106), the display control unit 505 causes the state notification lamp 223 to light up in red (step S107) and ends the process. Accordingly, even in a state in which none of the first region lamp 222a, the second region lamp 222b, the third region lamp 222c, and the fourth region lamp 222d are lit up, the user can recognize that this is not because there is no detection target but because a detection function does not work normally.

When the image analysis has been normally completed for all the captured images (YES in step S106), the image analysis unit 501 determines whether or not the detection target has been detected in at least one of the first region R1, the second region R2, the third region R3, and the fourth region R4 (step S108).

When the detection target has not been detected in any of the first region R1, the second region R2, the third region R3, and the fourth region R4 (NO in step S108), the display control unit 505 causes all of the first region lamp 222a, the second region lamp 222b, the third region lamp 222c, and the fourth region lamp 222d to be turned off. Further, the notification control unit 504 stops ringing of the buzzer 224 (step S109) and ends the process.

When the detection target has been detected in at least one of the first region R1, the second region R2, the third region R3, and the fourth region R4 (YES in step S108), the important detection object specifying unit 503 specifies the region, in which the distance specified in step S105 is shortest among the regions in which the detection target has been detected, as a region in which the detection target to which the most attention is to be paid has been detected (step S110).

The display control unit 505 causes the region specified in step S110 to light up in a first aspect and cause the other regions in which the detection target has been detected to light up in a second aspect (step S111). For example, the display control unit 505 may cause the region specified in step S110 to light up with relatively high brightness and cause the other regions in which the detection target has been detected to light up with relatively low brightness. Further, for example, the display control unit 505 may cause the region specified in step S110 to light up in red and cause the other regions in which the detection target has been detected to light up in yellow. Further, for example, the display control unit 505 may cause the region specified in step S110 to light up and cause the other regions in which the detection target has been detected to blink.

The image analysis unit 501 determines whether or not the region that has changed from a state in which the detection target has not been detected to a state in which the detection target has been detected is present among the first region R1, the second region R2, the third region R3, and the fourth region R4 (step S112). When there is at least one region that has changed from a state in which the detection target has not been detected to a state in which the detection target has been detected (YES in step S112), the notification control unit 504 determines whether or not the buzzer 224 has already emitted a warning sound (step S113).

When the buzzer 224 does not emit the warning sound (NO in step S113), the notification control unit 504 causes the buzzer 224 to emit the warning sound, starts measurement of a buzzer ringing time (step S114), and ends the process.

On the other hand, when the buzzer 224 has already emitted the warning sound (YES in step S113), the notification control unit 504 resets the buzzer ringing time, starts measurement again (step S115), and ends the process.

When there is no region that has changed from a state in which the detection target has not been detected to a state in which the detection target has been detected (NO in step S112), the notification control unit 504 determines whether or not the buzzer 224 has already emitted the warning sound (step S116).

When the buzzer 224 does not emit the warning sound (NO in step S116), the notification control unit 504 maintains a state in which the buzzer 224 is stopped and ends the process.

On the other hand, when the buzzer 224 has already emitted a warning sound (YES in step S116), the notification control unit 504 determines whether the buzzer ringing time is equal to or longer than a predetermined buzzer time (step S117). When the buzzer ringing time is shorter than the predetermined buzzer time (NO in step S117), the notification control unit 504 causes the buzzer 224 to continue the emission of the warning sound (step S118) and ends the process.

On the other hand, when the buzzer ringing time is equal to or longer than the predetermined buzzer time (YES in step S117), the notification control unit 504 stops the buzzer 224 (step S119) and ends the process. Thereby, the notification control unit 504 can allow the buzzer to ring again when a new detection target has been detected while preventing the buzzer from continuing to ring while the detection target is continuously detected in one region.

(Operations and Effects)

Thus, in the detection object notification system 200 according to the second embodiment, the lamp 222 of the detection object notification device 220 is provided along an outer periphery of the surroundings monitoring device 210. Thereby, the detection object notification device 220 can appropriately display a direction of the detection target even when the surroundings monitoring device 210 cannot be controlled.

Third Embodiment

Figure 9:
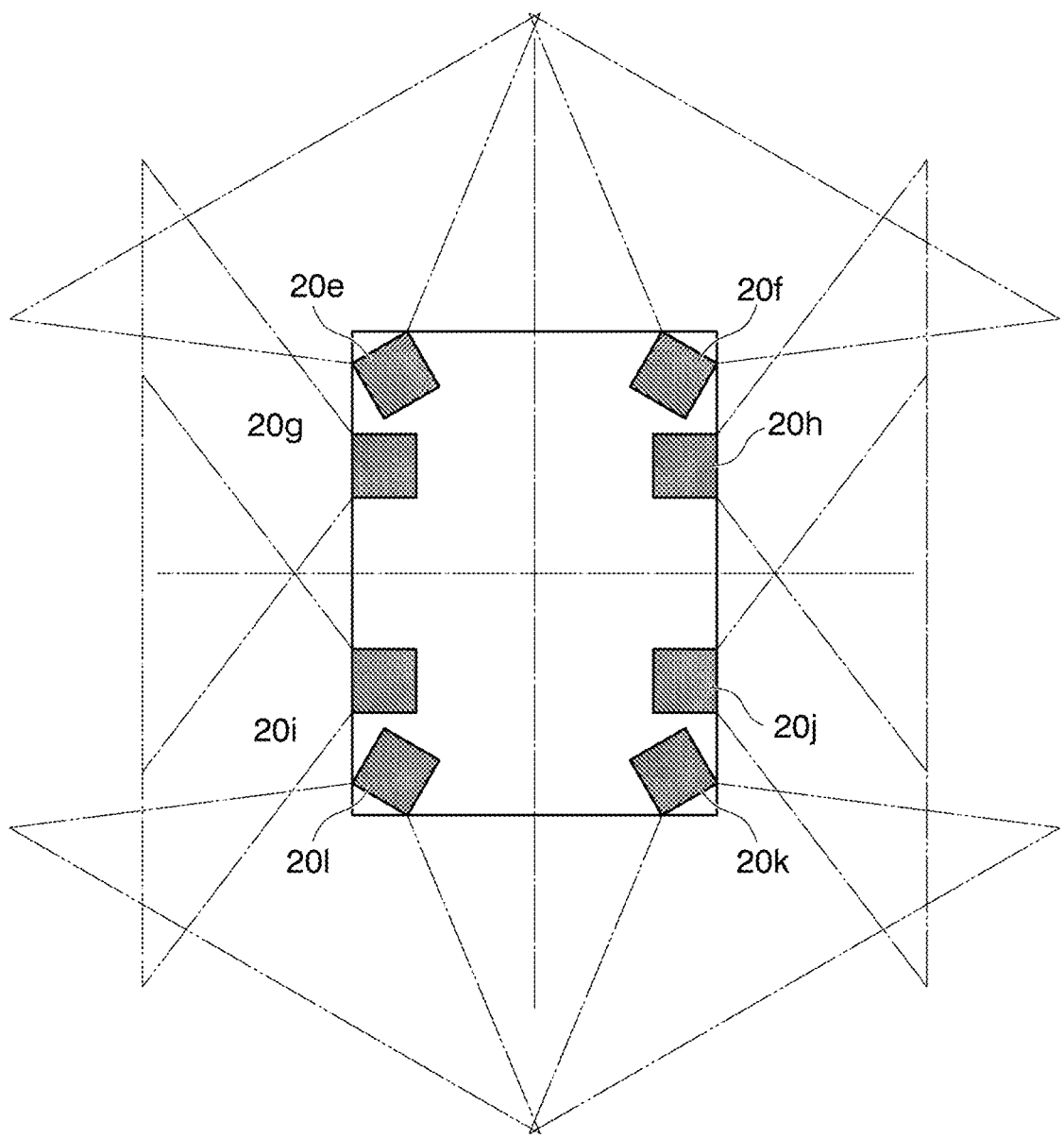
FIG. 9 is a diagram showing a camera arrangement of the industrial vehicle according to at least an embodiment of the present invention.

The industrial vehicle 1 according to the first embodiment includes four cameras. On the other hand, an industrial vehicle 1 according to the third embodiment includes eight cameras. FIG. 9 is a diagram showing a camera arrangement of the industrial vehicle according to the third embodiment.

The industrial vehicle 1 according to the third embodiment includes a camera 20e that captures an image of a diagonally left front region, a camera 20f that captures an image of a diagonally right front region, a camera 20g that captures an image of a left region from the front of a vehicle body, a camera 20h that captures an image of a right region from the front of the vehicle body, a camera 20i that captures an image of a left region from the rear of a vehicle body, a camera 20j that captures an image of a right region from the rear of the vehicle body, a camera 20k that captures an image of a diagonally left rear region, and a camera 20l that captures an image of a diagonally right rear region.

An image-capturing range of each camera according to the third embodiment extends over a plurality of regions. On the other hand, a boundary line between two regions in the image is not necessarily a center line of the image. Therefore, the control device 50 according to the third embodiment stores a boundary line partitioning a region for the respective cameras and determines whether the detection target is captured on the left side or captured on the right side of the boundary line to specify a region in which the detection target is present. The boundary line may be set parallel to a Y axis of the image or may be set with an inclination. Further, the boundary may be a straight line or may be a curved line.

Other Embodiments

In the embodiment of the present invention, a case in which the image-capturing device 20 includes the first camera 20a, the second camera 20b, the third camera 20c, and the fourth camera 20d has been described. However, in another embodiment of the present invention, the image-capturing device 20 may be able to capture images of all surroundings of the industrial vehicle 1 without creating a large blind spot, and the number of cameras included in the image-capturing device 20 and position at which the cameras are provided are not limited.

Further, the blind spot is likely to be large depending on a size of the industrial vehicle 1 or a range being capable of capture images by the cameras, in the four cameras exemplified in the embodiment of the present invention. In such a case, for example, the image-capturing device 20 may include five or more cameras to reduce the blind spot.

In the embodiment of the present invention, a case in which the notification device 30 includes the first speaker 30a, the second speaker 30b, the third speaker 30c, and the fourth speaker 30d has been described. However, in another embodiment of the present invention, the number of speakers and positions at which the speakers are provided are not limited as long as the notification device 30 is a speaker that outputs a sound in a direction or a region corresponding to a position at which a detection target is present with respect to the industrial vehicle 1 when the detection target has been detected.

In the embodiment of the present invention, a case in which the display control unit 505 displays the image captured by each of the image-capturing devices 20 in a small size has been described. However, in another embodiment of the present invention, when a detection target has been detected, the display control unit 505 may enlarge and display only an image including the detection target.

In the embodiment of the present invention, a case in which the display control unit 505 displays the image of the rear of the industrial vehicle 1 on the display unit 40 as it is has been described. However, in another embodiment of the present invention, the display control unit 505 may invert the image of the rear of the industrial vehicle 1 laterally and display the resultant image on the display unit 40 (that is, display the image on the display unit like a back monitor). Further, in another embodiment of the present invention, the display control unit 505 may generate a bird's-eye view image (of the vehicle) by processing an image of the surroundings of the industrial vehicle 1 and display the generated bird's-eye view image on the display unit 40.

In the embodiment of the present invention, a case in which the image analysis unit 501 detects the detection target in the entire acquired image has been described. However, in another embodiment of the present invention, the image analysis unit 501 may detect the detection target only in a portion of the acquired image (for example, a lower half of the image, that is, a half of the image-capturing region close to the industrial vehicle 1). That is, in another embodiment of the present invention, the image analysis unit 501 may not determine that the detection target is a detection target even when the detection target is captured in regions other than the portion of the acquired image. In this case, the notification control unit 504 performs control so that a sound is output from the speaker because the detection target captured in the image is not determined to be a detection target.

An order of the processes according to the embodiment of the present invention may be changed in a range in which an appropriate process is performed.

Each of the storage unit 506 and other storage devices in the embodiment of the present invention may be included anywhere in a range in which appropriate information transmission and reception are performed. Further, there may be a plurality of storage units 506 and other storage devices in a range in which the appropriate information transmission and reception are performed, and the storage units 506 and other storage devices may store data in a distributive manner.

Although the embodiments of the present invention have been described, the above-described control device 50 and other control devices may include a computer system therein. The steps of the process described above are stored in the form of a program in a computer-readable medium, and a computer reads and executes this program so that the above process is performed. A specific example of the computer is shown below.

Figure 10:
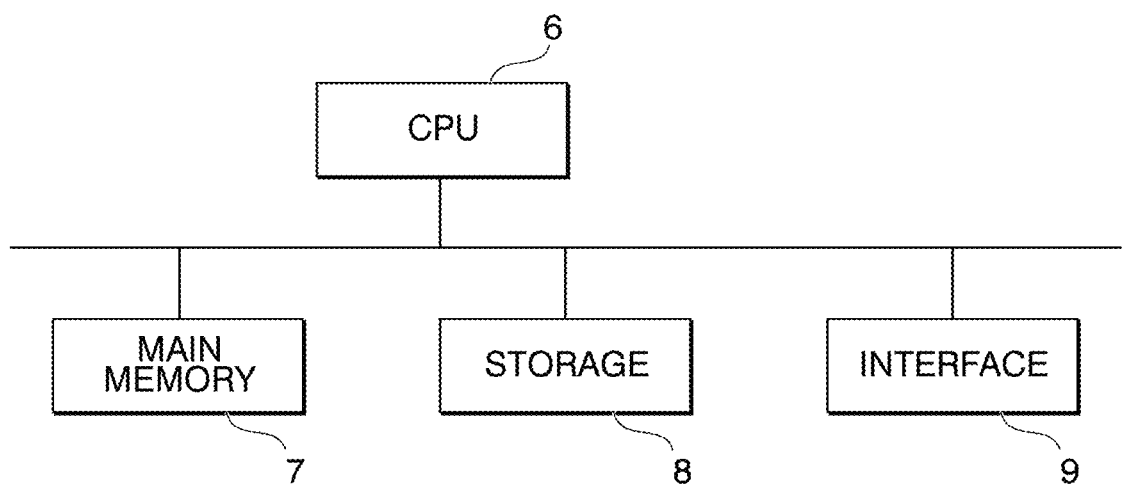
FIG. 10 is a schematic block diagram showing a configuration of a computer according to at least an embodiment.

FIG. 10 is a schematic block diagram showing a configuration of a computer according to at least an embodiment.

A computer 5 includes a CPU 6, a main memory 7, a storage 8, and an interface 9, as shown in FIG. 10.

For example, each of the above-described control device 50 and other control devices is mounted in the computer 5. An operation of each processing unit described above is stored in the storage 8 in the form of a program. The CPU 6 reads the program from the storage 8, loads the program in the main memory 7, and executes the above process according to the program. Further, the CPU 6 secures a storage area corresponding to each of the above-described storage units in the main memory 7 according to the program.

Examples of the storage 8 include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 8 may be an internal medium directly connected to a bus of the computer 5 or an external medium connected to the computer 5 via the interface 9 or a communication line. Further, when this program is distributed to the computer 5 via a communication line, the computer 5 that has received the program may load the program into the main memory 7 and execute the above process. In at least an embodiment, the storage 8 is a non-transitory tangible computer readable medium.

Further, the above program may realize some of the above-described functions. Further, the above program may be a file capable of realizing the above-described functions in combination with a program previously recorded in a computer system, that is, a differential file (a differential program).

In another embodiment, a control device 127 includes a custom large scale integrated circuit (LSI), such as a programmable logic device (PLD), an application specialized circuit (ASIC), a graphics processing unit (GPU), and a similar processing device, in addition to or in place of the above-described configuration. Examples of the PLD include a programmable array logic (PAL), a generic array logic (GAL), a complex programmable logic device (CPLD), and a field programmable gate array (FPGA). In this case, some or all of the functions realized by the processor may be realized by the integrated circuit.

Several embodiments of the present invention have been described, but these embodiments are examples and do not limit the scope of the invention. Various additions, omissions, substitutions, and changes may be made to these embodiments without departing from the gist of the invention.

EXPLANATION OF REFERENCES

1 Industrial vehicle
5 Computer
6 CPU
7 Main memory
8 Storage
9 Interface
10 Operation device
20 Image-capturing device
20a First camera
20b Second camera
20c Third camera
20d Fourth camera
30 Notification device
30a First speaker
30b Second speaker
30c Third speaker
30d Fourth speaker
40 Display unit
50 Control device
200 Detection object notification system
210 Surroundings monitoring device
220 Detection object notification device
221 housing unit
222a First region lamp
222b Second region lamp
222c Third region lamp
222d Fourth region lamp
223 State notification lamp
224 Buzzer 225 Control device
501 Image analysis unit
502 Operation determination unit
503 Important detection object specifying unit
504 Notification control unit
505 Display control unit
506 Storage unit

What is claimed is:

1. A control device comprising:
a specifying unit configured to specify one of a plurality of detection objects on the basis of a state of an industrial vehicle when the plurality of detection objects are detected around the industrial vehicle on the basis of a captured image of an image-capturing device including a plurality of cameras;
a surroundings display unit including a display that is configured to display a bird's-eye view image of surroundings of the industrial vehicle created from the captured image of the image-capturing device;
a display unit including a plurality of lamps provided along an outer periphery of the display; and
a control unit configured to cause, among the plurality of lamps, one lamp corresponding to a region which is in the bird's-eye view image displayed in the display and in which the image of the one detection object specified by the specifying unit is captured to light up or be turned off in an aspect different from another lamp corresponding to a region in which an image of the other detected detection object is captured on the basis of information on the camera that has captured an image of the one detection object specified by the specifying unit and the captured image used for specifying of the detection object.

2. The control device according to claim 1, wherein the state includes at least one of a distance between the industrial vehicle and the detection object, a steering angle of a wheel of the industrial vehicle, and a traveling direction of the industrial vehicle.

3. The control device according to claim 1, wherein the control unit displays the one detection object specified by the specifying unit on a display unit in an aspect different from those of the other detected detection objects.

4. The control device according to claim 1, wherein the control unit displays the captured image used for specifying of the one detection object on a display unit on the basis of the information on the camera that has captured an image of the one detection object specified by the specifying unit.

5. The control device according to claim 4, wherein the control unit specifies a position of the detection object to be displayed on the display unit on the basis of a position of the detection object in the captured image and the information on the camera.

6. The control device according to claim 1, wherein the control unit outputs a sound different from the other detection object from a speaker corresponding to a position of the one detection object specified by the specifying unit.

7. A control method of controlling a detection object notification system including:
a surroundings display unit including a display that is configured to display a bird's-eye view image of surroundings of the industrial vehicle created from a captured image of an image-capturing device including a plurality of cameras; and
a display unit including a plurality of lamps provided along an outer periphery of the display,
the control method comprising the steps of:
specifying one of a plurality of detection objects on the basis of a state of an industrial vehicle when the plurality of detection objects are detected around the industrial vehicle on the basis of the captured image of the image-capturing device; and
causing, among the plurality of lamps, one lamp corresponding to a region which is in the bird's-eye view image displayed in the display and in which the image of the one detection object specified is captured to light up or be turned off in an aspect different from another lamp corresponding to a region in which an image of the other detected detection object is captured on the basis of information on the camera that has captured an image of the one specified detection object and the captured image used for specifying of the detection object.

8. A non-transitory tangible computer readable medium storing a program for causing a computer in a detection object notification system including:
a surroundings display unit including a display that is configured to display a bird's-eye view image of surroundings of the industrial vehicle created from a captured image of an image-capturing device including a plurality of cameras; and
a display unit including a plurality of lamps provided along an outer periphery of the display, to:
specify one of a plurality of detection objects on the basis of a state of an industrial vehicle when the plurality of detection objects are detected around the industrial vehicle on the basis of a captured image of the image-capturing device including the plurality of cameras; and
cause, among the plurality of lamps, one lamp corresponding to a region which is in the bird's-eye view image displayed in the display and in which the image of the one detection object specified is captured to light up or be turned off in an aspect different from another lamp corresponding to a region in which an image of the other detected detection object is captured on the basis of information on the camera that has captured an image of the one specified detection object and the captured image used for specifying of the detection object.

* * * * *